(12) United States Patent
Christensen et al.

(10) Patent No.: US 9,933,617 B2
(45) Date of Patent: Apr. 3, 2018

(54) MIRROR INCLUDING POLYCRYSTALLINE DIAMOND BODY FOR USE WITH A MOTOR, SCANNING SYSTEMS INCLUDING THE SAME, AND RELATED METHODS

(71) Applicant: US SYNTHETIC CORPORATION, Orem, UT (US)

(72) Inventors: Nicholas Edward Christensen, Spanish Fork, UT (US); Alexander Edward Black, Orem, UT (US); Benjamin Michael Spencer, Spanish Fork, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 15/307,240

(22) PCT Filed: May 18, 2015

(86) PCT No.: PCT/US2015/031404
§ 371 (c)(1),
(2) Date: Oct. 27, 2016

(87) PCT Pub. No.: WO2015/183619
PCT Pub. Date: Dec. 3, 2015

(65) Prior Publication Data
US 2017/0068090 A1 Mar. 9, 2017

Related U.S. Application Data

(60) Provisional application No. 62/001,314, filed on May 21, 2014.

(51) Int. Cl.
*G02B 26/12* (2006.01)
*G02B 26/10* (2006.01)
(Continued)

(52) U.S. Cl.
CPC ............ *G02B 26/105* (2013.01); *G02B 1/02* (2013.01); *G02B 5/0808* (2013.01)

(58) Field of Classification Search
USPC ...................... 359/198.1–200.1, 202.1, 201.2
See application file for complete search history.

(56) References Cited

U.S. PATENT DOCUMENTS

| | | |
|---|---|---|
| 6,453,005 B2 | 9/2002 | Kaiser et al. |
| 7,866,418 B2 | 1/2011 | Bertagnolli et al. |
| 8,080,071 B1 | 12/2011 | Vail |

FOREIGN PATENT DOCUMENTS

| | | |
|---|---|---|
| DE | 19955574 | 7/2001 |
| JP | S5669611 | 6/1981 |

(Continued)

OTHER PUBLICATIONS

International Search Report and Written Opinion from International Application No. PCT/US2015/031404 dated Dec. 17, 2015.

(Continued)

*Primary Examiner* — Mohammed Hasan
(74) *Attorney, Agent, or Firm* — Dorsey & Whitney LLP

(57) ABSTRACT

Mirrors for a deflection unit in a scanning system, scanning systems using such mirrors, and methods of manufacturing such mirrors are disclosed. In an embodiment, a mirror for a deflection unit in a laser system includes a sintered polycrystalline diamond body including a plurality of randomly oriented diamond grains defining a plurality of interstitial regions. At least a portion of the interstitial regions includes a material disposed interstitially therein. The mirror includes a reflective surface formed at least partially from the sintered polycrystalline diamond body or provided thereon. The reflective surface exhibits a surface roughness of less than about 50 nm Rrms.

15 Claims, 5 Drawing Sheets

(51) Int. Cl.
    *G02B 5/08*     (2006.01)
    *G02B 1/02*     (2006.01)

(56) References Cited

FOREIGN PATENT DOCUMENTS

| WO | 2005/022209 | | 3/2005 |
|---|---|---|---|
| WO | 2009068222 | A1 | 6/2009 |

OTHER PUBLICATIONS

"Fiber Laser Cleaning of Metal Mirror Surfaces for Optical Diagnostic Systems of the ITER," Voprosy atomnoi nauki i tekhniki. Ser. Termoyaderny sintez. 2014, t.37, vyp.4, s.53-56, fig.8.
U.S. Appl. No. 62/001,314, filed May 21, 2014, Christensen.

MIRROR INCLUDING POLYCRYSTALLINE DIAMOND BODY FOR USE WITH A MOTOR, SCANNING SYSTEMS INCLUDING THE SAME, AND RELATED METHODS

CROSS-REFERENCE TO RELATED APPLICATIONS

This application claims priority to U.S. Provisional Application No. 62/001,314 filed on 21 May 2014, the disclosure of which is incorporated herein, in its entirety, by this reference.

BACKGROUND

Mirror galvanometer systems are used in many different applications, such as machining, scanning, or marking, without limitation. When machining, scanning, or marking a workpiece using a laser (e.g., when drilling substrates), deflection units are used to deflect the laser beam one-dimensionally or two-dimensionally or more with at least one movable mirror so that the laser beam can be directed onto any point of a given area or volume. To deflect the mirrors, Galvo motors are typically used, which make very fast and accurate movements possible. Conventionally, high-performance laser systems use beryllium, glass, or silicon as a mirror substrate.

Highly oriented diamond ("HOD") has been used as a mirror in a laser system, such as disclosed in PCT Publication No. WO2005/022209 (PCT International Application No.: PCT/EP2004/051396). The mirror includes a number of diamond segments of HOD. Each diamond segment has a high degree of planarity due to its small surface area of 10 by 10 mm$^2$ These diamond segments may be joined together and glued or bonded to obtain a larger planar surface area. However, this process is very expensive.

However, there is still a need for improved diamond mirrors and methods for fabricating such diamond mirrors.

SUMMARY

Embodiments of the invention relate to a mirror fabricated at least partially from polycrystalline diamond ("PCD"), scanning systems employing such mirrors such as laser systems, and methods of manufacturing such mirrors. The mirror may be used in a deflection unit of a scanning system including a motor. PCD provides a relatively high degree of stiffness to the mirror. Generally, stiffness is given by the ratio of the modulus of elasticity to the density or mass of the mirror.

In an embodiment, a mirror for a deflection unit in a scanning system is disclosed. The mirror includes a sintered PCD body configured to be operably coupled to a motor. The sintered PCD body includes a plurality of randomly oriented diamond grains defining a plurality of interstitial regions. At least a portion of the interstitial regions includes a material disposed interstitially therein. The mirror includes a reflective surface formed at least partially from the sintered polycrystalline diamond body or provided thereon. The reflective surface exhibits a surface roughness of less than about 50 nm Rms.

In an embodiment, the sintered PCD body may be polished to act like a mirror without a reflective coating thereon. In another embodiment, the sintered PCD body may also include a reflective material coating thereon or infiltrated therein, such as beryllium, aluminum, gold, silver, alloys thereof, combinations thereof, or the like.

In an embodiment, a scanning system is disclosed that may employ any of the disclosed mirrors at least partially made from sintered PCD. The scanning optical system includes an electromagnetic energy source configured to output electromagnetic energy, and a deflection unit. The deflection unit includes a mirror positioned to receive the electromagnetic energy. The mirror includes a sintered polycrystalline diamond body including a plurality of randomly oriented diamond grains defining a plurality of interstitial regions, with at least a portion of the interstitial regions including a material disposed interstitially therein. The deflection unit further includes a motor operably coupled to the mirror and configured to rotate the mirror to selectively deflect the electromagnetic energy.

In an embodiment, a method of fabricating a mirror for a deflection unit in a scanning system is disclosed. The method includes sintering a plurality of diamond particles in the presence of a material at a pressure of at least 4.0 GPa and a temperature of at least 1000° C. to form a sintered PCD body. The method further includes polishing at least one surface of the PCD body to form a reflective surface having a surface roughness of less than about 50 nm Rms, which is configured to reflect electromagnetic energy.

In an embodiment of another method for fabricating a mirror for a deflection unit in a scanning system, the method includes sintering a plurality of diamond particles in the presence of a material at a pressure of at least 4.0 GPa and a temperature of at least 1000° C. to form a sintered PCD body. The method further includes brazing a reflective coating to the sintered PCD body with a braze alloy.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

I. Introduction

Embodiments of the invention relate to a mirror fabricated at least partially from PCD, scanning systems such as laser systems or other optical apparatuses including such mirrors, and methods of manufacturing such mirrors, and other related methods. The mirror may be used in a deflection unit of an optical system including a motor, such as a Galvo motor. PCD has one of the largest modulus of elasticity among various materials. For example, diamond has a modulus of elasticity of 897 GPa. Generally, a specific stiffness (or a specific modulus) of a material is given by the ratio of the modulus of elasticity to the density of the material.

Table 1 below lists a comparison of material properties for various materials including PCD. PCD has the highest density among all the listed materials in Table 1. Because the modulus of elasticity of PCD is much higher than all the other materials, PCD has the highest stiffness. The inertia ratio is the ratio of the moment of inertia of a material to the moment of inertia of beryllium for a given geometry, such as a plate. For a given geometry, the inertia ratio is the ratio of the density of the material to the density of beryllium. Thus, a smaller geometry or dimension of the PCD may be utilized, exhibiting a lower moment of inertia without loss in stiffness. Thermal properties including thermal conductivity, specific heat, and coefficient of thermal expansion are also listed in Table 1. The thermal properties of the materials can be important to energy absorption. For example, the mirror may absorb some of the laser energy and perhaps the heat generated from the motor.

mirror has an equivalent stiffness with significantly less material volume. Thus, the moment of inertia of the mirror, for a given reflection area of the mirror, may be reduced such that the performance of the laser system or other electromagnetic wave reflecting system may be improved. More details about an embodiment of a mirror for a laser system are provided hereinbelow. In general, the mirror embodiments disclosed herein may be used in any mirror application, any mirror galvanometer, or any type of mirrors including, but not limited to x-ray mirrors, dielectric mirrors, active mirrors, atomic mirrors, convex mirrors, concave mirrors, cold mirrors, corner reflectors, radio frequency mirrors, microwave mirrors, etc., without limitation.

II. Mirror Embodiments

Figure 1A:
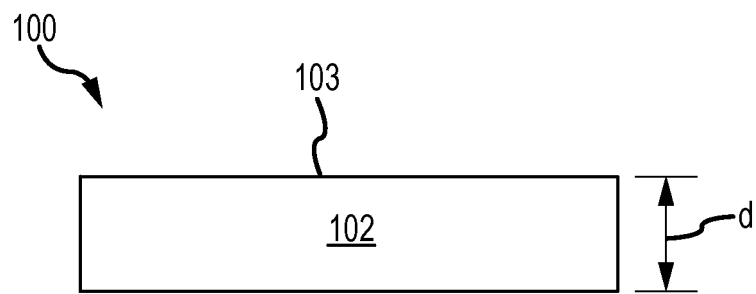
FIG. 1A is a cross-sectional view of a mirror including a PCD body according to an embodiment of the invention.

FIG. 1A is a cross-sectional view of a mirror 100 at least partially fabricated from PCD according to an embodiment of the invention. The mirror 100 includes a sintered PCD body 102, which including a reflective surface 103 that is polished to exhibit a highly reflective mirror-like surface finish. For example, the reflective surface 103 may be polished using chemical-mechanical polishing, mechanical polishing, electropolishing, or combinations thereof. The reflective surface 103 exhibits a relatively very low surface roughness compared to PCD used in wear resistance applications. For example, the reflective surface 103 may exhibit a surface roughness of less than about 50 nm Rrms, such as about 1 nm Rrms to about 50 nm Rrms, less than about 40 nm Rrms, about 1 nm Rrms to about 30 nm Rrms, 5 nm Rrms to about 15 nm Rrms, 1 nm Rrms to about 5 nm Rrms, or 25 nm Rrms to about 40 nm Rrms. Depending on the particular application, the reflective surface 103 may be substantially planar as illustrated, substantially spherical, or substantially cylindrical.

The sintered PCD body 102 includes a number of directly bonded diamond grains exhibiting diamond-to-diamond bonding (e.g., $sp^3$ bonding) therebetween. The directly bonded diamond grains define a number of interstitial regions that may be at least partially filled with metal-solvent catalyst used to catalyze formation of the PCD of the sintered PCD body 102 or other material. As the diamond grains are sintered together, the diamond grains are generally randomly oriented and generally do not exhibit a preferred crystallographic orientation as opposed to HOD.

TABLE 1

Material Properties for Various Materials

|  | Beryllium | Albemet AM162 | Berylcast 363 | Aluminum 6061-T6 | Quartz | PCD |
|---|---|---|---|---|---|---|
| Inertia Ratio | 1 | 1.12 | 1.17 | 1.46 | 1.19 | 2.04 |
| Density (g/cm$^3$) | 1.85 | 2.071 | 2.16 | 2.7 | 2.202 | 3.77 |
| Modulus of Elasticity (GPa) | 303 | 193 | 202 | 69 | 74.5 | 897 |
| Specific Stiffness (GPa * cm$^3$/g) | 164 | 93 | 94 | 26 | 34 | 238 |
| Thermal Conductivity (Btu/in-h F.) | 1499 | 1457 | 732 | 1186 | 0.2 | 3768 |
| Specific Heat (Btu/lb F.) | 0.46 | 0.37 | 0.3 | 0.23 | 0.177 | 0.189 |
| Coefficient of Thermal Expansion (μin/in F.) | 6.3 | 7.7 | 7.6 | 13.2 | 0.3 | 1.33 |

According to one or more embodiments of the invention, the PCD mirrors disclosed herein (with or without a reflective coating) may be relatively thinner because the PCD As discussed in more detail below, the sintered PCD body 102 may be made in a high-pressure/high-temperature ("HPHT") sintering process. This HPHT sintering process may have advantages over assembling small planar diamond segments to make a large planar substrate of HOD. For example, the assembling process for HOD segments may be complicated in order to achieve the alignments of the small segments to be a mirror. Also, the processing for the assembling process may be more expensive. Furthermore, it may be difficult to obtain consistency in the alignments of the small planar diamond segments of HOD.

The grain size of the sintered PCD body 102 may also affect the reflectivity of the mirror 100. Generally, small grain sizes may increase wear resistance and may be suitable for applications such as bearing elements or cutting elements. Large grain sizes may increase reflectivity of the mirror 100 after polishing because of less grain boundary area on a polished surface without any reflective coating. In various embodiments, the plurality of diamond grains may be relatively large and have an average grain size of about 40 μm to about 150 μm, such as 50 μm to about 120 μm, 70 μm to about 100 μm, or 40 μm to about 80 μm.

The sintered PCD body 102 exhibits a thickness "d" that may be about 0.2 mm to about 1 mm. For example, the thickness "d" may be about 0.2 mm to about 0 8 mm or about 0.3 mm to about 0.6, or about 0.2 mm to about 0.5 mm.

Figure 1B:
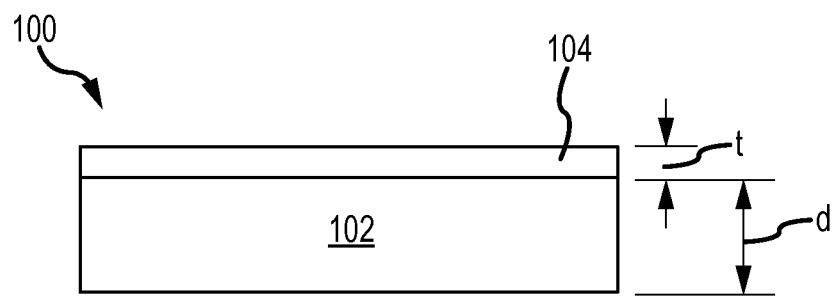
FIG. 1B is a cross-sectional view of a mirror including a PCD body having a reflective coating according to an embodiment of the invention.

Referring to FIG. 1B, in another embodiment, the mirror 100 includes a reflective coating 104 deposited over the PCD body 102. The reflective coating 104 may be formed from a metallic material, such as beryllium (Be), aluminum (Al), silver (Ag), gold (Au), copper (Cu), nickel (Ni), platinum (Pt), rhodium (Rh), alloys thereof, combinations thereof, or the like. The reflective coating 104 may also include a dielectric thin film optical coating including zinc sulfide, titanium dioxide, magnesium fluoride, silicon dioxide, combinations thereof, or multilayer thin film optical coatings of the foregoing, without limitation. The reflective coating 104 may be chosen to have a selectivity to suitably reflect a primary wavelength of a laser beam of a laser system or other electromagnetic energy/radiation emitted from an optical source in which the mirror is used as a deflection unit. The reflective coating 104 exhibits a thickness "t" that may be greater than 0 to about 1 mm, about 0.2 mm to about 0.8 mm, about 0.5 mm to about 0.9 mm, about 0.01 nm to about 900 nm, about 0.01 nm to about 40 nm, about 5 nm to about 40 nm, about 8 nm to about 20 nm, or about 10 nm to about 15 nm. As with the reflective surface 103, the reflective coating 104 may exhibit a relatively low surface roughness, such as less than about 50 nm Rrms, less than about 40 nm Rrms, about 1 nm Rrms to about 50 nm Rrms, about 1 nm Rrms to about 30 nm Rrms, 5 nm Rrms to about 15 nm Rrms, 1 nm Rrms to about 5 nm Rrms, or 25 nm Rrms to about 40 nm Rrms.

As will be discussed in more detail below, the sintered PCD body 102 may be formed on a cemented carbide substrate (see FIG. 6) in an HPHT sintering process by sintering diamond particles on a cemented carbide substrate, such as tungsten carbide, tantalum carbide, vanadium carbide, niobium carbide, chromium carbide, titanium carbide, or combinations of the foregoing carbides cemented with iron, nickel, cobalt, or alloys of the foregoing metals. In an embodiment, the cemented carbide substrate may be a cobalt-cemented tungsten carbide substrate. In some embodiments, the cemented carbide substrate may be removed after sintering (e.g., by grinding and/or leaching) to reduce the weight of the mirror 100, while in other embodiments the cemented carbide substrate (or a portion thereof) may remain bonded to the sintered PCD body 102 and may form a base of the mirror 100. The cementing constituent of the cemented carbide substrate (e.g., cobalt from a cobalt-cemented tungsten carbide substrate) may be liquefied and may infiltrate the diamond particles and may catalyze diamond-to-diamond bonding between the diamond particles during the HPHT sintering process.

Figure 2A:
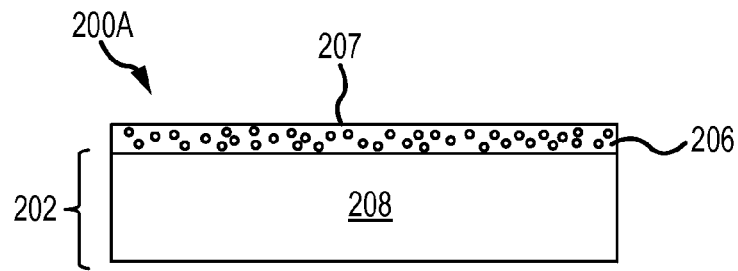
FIG. 2A is a cross-sectional view of a mirror including the PCD body shown in FIG. 1 after leaching metal-solvent catalyst therefrom according to an embodiment of the invention.

FIG. 2A is a cross-sectional view of a mirror 200A including the PCD body 102 shown in FIG. 1 after leaching metal-solvent catalyst from a region thereof according to an embodiment of the invention. The mirror 200A may include a reflective surface 207 on a sintered PCD body 202 having a leached region 206 and unleached region 208. The sintered PCD body 202 may be chemically leached to deplete the metal-solvent catalyst or other material that previously occupied the interstitial regions between the bonded diamond grains to form the leached region 206, with the unaffected underlying PCD region labeled as unleached region 208.

Figure 2B:
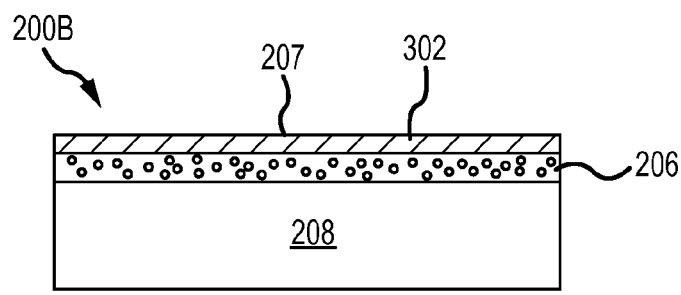
FIG. 2B is a cross-sectional view of a mirror including the PCD body shown in FIG. 2A according to an embodiment of the invention.

FIG. 2B is a cross-sectional view of a mirror 200B including the PCD body shown in FIG. 2A according to an embodiment of the invention. The mirror 200B may include a reflective coating 302 over the leached region 206. As shown in FIG. 2B, optionally, after leaching to at least partially remove the metal-solvent catalyst from the sintered PCD body 202, unoccupied pores formed therein may be at least partially filled with the reflective coating material, such as beryllium (Be), aluminum (Al), silver (Ag), gold (Au), copper (Cu), nickel (Ni), platinum (Pt), rhodium (Rh), alloys thereof, combinations thereof, or the like. For example, the reflective material or another material may be deposited into the unoccupied pores of the leached region 206 via a liquid infiltration process (e.g., HPHT or hot-isostatic pressing infiltration of the reflective material). In another embodiment, a reflective coating may be coated on at least one surface of the PCD body 202. In another embodiment, optionally, a reflective coating 302 may be formed upon at least one surface of the sintered PCD body 202 by chemical vapor deposition ("CVD") or physical vapor deposition ("PVD"). After infiltrating and/or coating the sintered PCD body 202, a reflective surface 207 may be polished to exhibit a highly polished surface finish. For example, the reflective surface 207 may be polished using chemical-mechanical polishing, mechanical polishing, lapping, electropolishing, or combinations thereof to exhibit any of the surface roughness values disclosed herein.

Figure 2C:
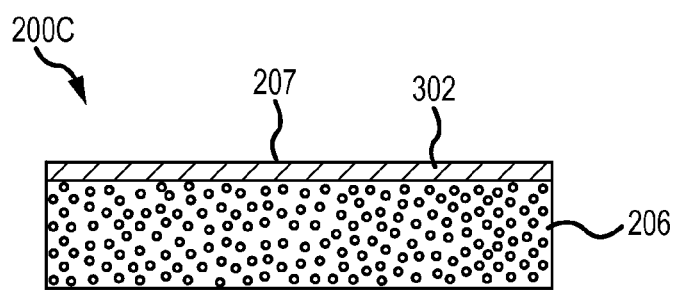
FIG. 2C is a cross-sectional view of a mirror including the PCD body shown in FIG. 1 after leaching metal-solvent catalyst therefrom according to another embodiment of the invention.

FIG. 2C is a cross-sectional view of a mirror 200C including the sintered PCD body shown in FIG. 1 after leaching metal-solvent catalyst therefrom according to an embodiment of the invention. The mirror 200C may include a reflective coating 302 over a leached region 206, which may be formed by leaching the sintered PCD body 102 to substantially completely leach all of the metal-solvent catalyst or other material from the interstitial regions thereof. The reflective coating 302 may be made from any of the reflective materials disclosed herein. The reflective coating 302 may include a reflective surface 207 that may be polished using any of the techniques disclosed herein to exhibit any of the surface roughness values disclosed herein.

Figure 2D:
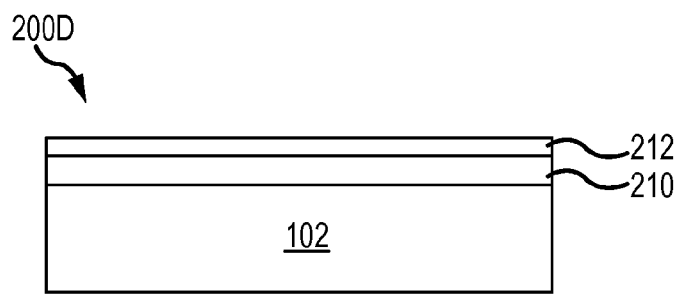
FIG. 2D is a cross-sectional view of a mirror including the PCD body shown in FIG. 1 along with a carbide layer disposed between the PCD body and a reflective layer.

FIG. 2D is a cross-sectional view of a mirror 200D including the PCD body shown in FIG. 1 and with a carbide layer interposed between the sintered PCD body and a reflective layer according to an embodiment of the invention. The mirror 200D includes the sintered PCD body 102 having a carbide layer 210 bonded thereto, and a reflective layer 212 made from any of the reflective materials disclosed herein bonded to the carbide layer 210. For example, the carbide layer 210 may comprise a tungsten carbide layer that may be substantially free of a binder such as cobalt. In an embodiment, the tungsten carbide layer may be formed by CVD or variants thereof (e.g., plasma-enhanced CVD, etc., without limitation). Specifically, for example, an example of a commercially available CVD tungsten carbide layer (currently marketed under the trademark HARDIDE®) is currently available from Hardide Layers Inc. of Houston, Texas. In other embodiments, a tungsten carbide layer may be formed by PVD, variants of PVD, high-velocity oxygen fuel ("HVOF") thermal spray processes, or any other suitable process, without limitation. The reflective layer 212 may be polished using any of the techniques disclosed herein to form a reflective surface that exhibits any of the surface roughness values disclosed herein.

In another embodiment, the reflective layer 212 may be omitted and the carbide layer 210 may be polished using any of the techniques disclosed herein to form a reflective surface that exhibits any of the surface roughness values disclosed herein. In yet another embodiment, the carbide layer 210 or a cemented carbide substrate (e.g., a cobalt-cemented tungsten carbide substrate) may be highly polished used as the mirror.

Figure 3:
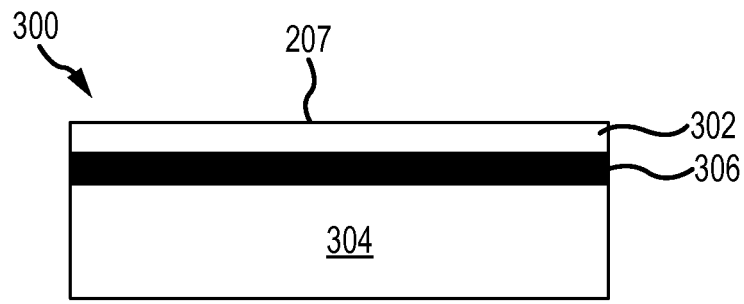
FIG. 3 is a cross-sectional view of a mirror with a reflective coating brazed to a PCD body according to an embodiment of the invention.

FIG. 3 is a cross-sectional view of a mirror 300 having a reflective coating brazed to a sintered PCD body according to an embodiment of the invention. The mirror 300 may include a reflective coating/layer 302 brazed to a sintered PCD body 304 with a braze alloy 306. The reflective coating 302 may be brazed to the sintered PCD body 304 by the braze alloy 306, such as an active braze alloy or other suitable type of braze alloy. Suitable braze alloys for the braze alloy 306 include gold, silver, copper, or titanium alloys. For example, suitable braze alloys for the braze alloy 306 may include gold-tantalum alloys or silver-copper-titanium alloys. In one specific embodiment, a braze alloy for the braze alloy 306 may comprise an alloy of about 4.5 weight % titanium, about 26.7 weight % copper, and about 68.8 weight % silver, otherwise known as TICUSIL®, which is currently commercially available from Wesgo Metals, Hayward, Calif. In a further embodiment, a braze alloy for the braze alloy 306 may comprise an alloy of about 25 weight % gold, about 37 weight % copper, about 10 weight % nickel, about 15 weight % palladium, and about 13 weight % manganese, otherwise known as PALNICUROM® 10, which is also currently commercially available from Wesgo Metals, Hayward, Calif. Another suitable braze alloy may include about 92.3 weight % nickel, about 3.2 weight % boron, and about 4.5 weight % silicon. Yet another suitable braze alloy may include about 92.8 weight % nickel, about 1.6 weight % boron, and about 5.6 weight % silicon. In some embodiments, the sintered polycrystalline diamond body may be leached to allow for more effective bonding of the braze alloy 306 to the sintered polycrystalline diamond body. For example, the reflective coating 302 may be brazed to the leached region 206 of the sintered polycrystalline body 202 via the braze alloy 306.

After brazing the reflective coating 302 to the sintered PCD body 304, a reflective surface 207 of the reflective coating 302 may be polished to exhibit a highly polished surface finish. For example, the reflective surface 207 of the reflective coating 302 may be polished using chemical-mechanical polishing, mechanical polishing, lapping, electropolishing, or combinations thereof to exhibit any of the surface roughness values disclosed herein.

III. Scanning System Embodiments

Figure 4A:
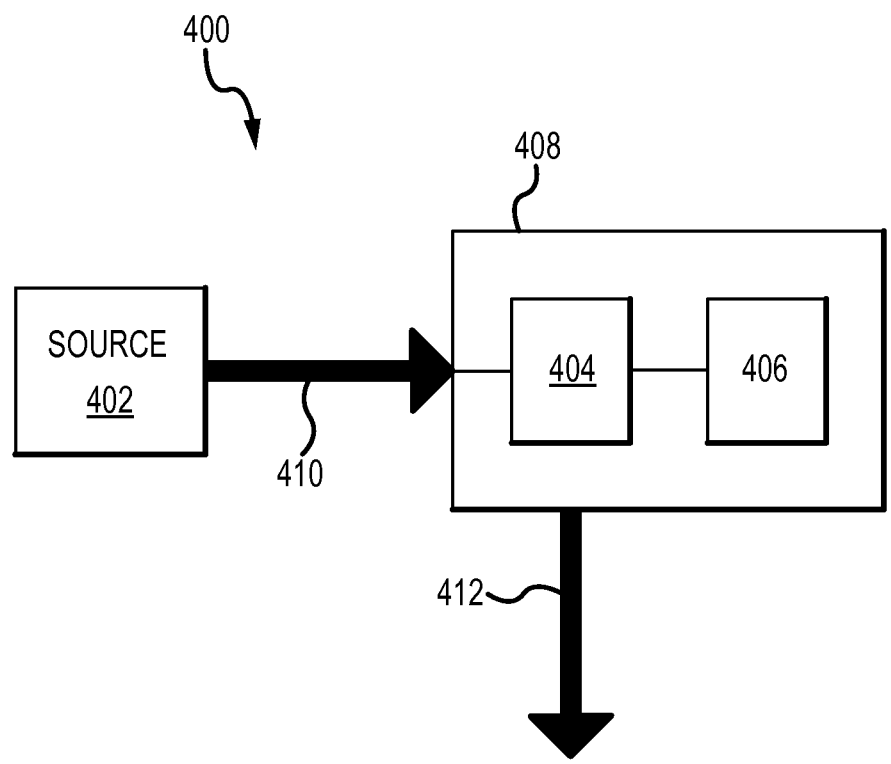
FIG. 4A is a simplified diagram of a laser system including a Galvo motor and a mirror in accordance with any of the embodiments of the invention.
Figure 4B:
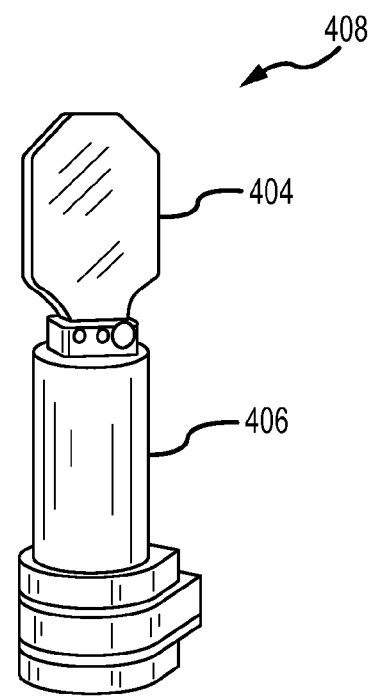
FIG. 4B is an isometric view of a deflection unit that may be used in any of the scanning systems disclosed herein according to an embodiment of the invention.

The mirrors disclosed herein may be used in a number of different optical systems, scanning optical systems, such as laser systems, cameras, and many other types of scanning systems. FIG. 4A is a simplified diagram of a laser system 400 including a motor operably coupled to a mirror in accordance with embodiments of the invention. The laser system 400 includes a laser source 402 configured to output a laser beam 410 and a deflection unit 408 positioned to receive the laser beam 410. FIG. 4B illustrates a deflection unit 408 according to an embodiment that may be used in the laser system 400 or any other scanning optical system disclosed herein. As shown in FIG. 4B, the deflection unit 408 may include a mirror 404 according to any of the embodiments disclosed herein attached to a motor 406 that is configured to rotate the mirror 404.

Referring again to FIG. 4A, in operation, the laser source 402 outputs the laser beam 410, which may be deflected by the deflection unit 408 to change the direction of the laser beam 410 to be directed as a deflected laser beam 412 at a selected angle relative to the laser beam 410. The deflected laser beam 412 may be used for scanning, drilling or other applications, such as drilling vias in a semiconductor wafer, laser machining, or laser ablation.

The deflection unit 408 includes a mirror 404, such as any of the PCD mirrors disclosed herein, and a motor 406 (e.g., a Galvo motor or other actuator such as a magnetic, shape memory alloy, or piezoelectric actuator) operably coupled to the mirror 404 and configured to rotate or move the mirror 404 to selectively deflect the laser beam 410 as the deflected laser beam 412. The mirror 404 may be attached to the motor 406, such as via clamping the mirror 404, mounting the mirror 404 to a support plate that is coupled to the motor 406, or other suitable attachment technique.

The PCD mirror may allow for higher operating speeds using comparable Galvo motors. To further increase the operating speeds, it may also be possible to use smaller motors while the mirror size stays approximately the same. The smaller motors would be lighter than the larger motors.

Figure 5:
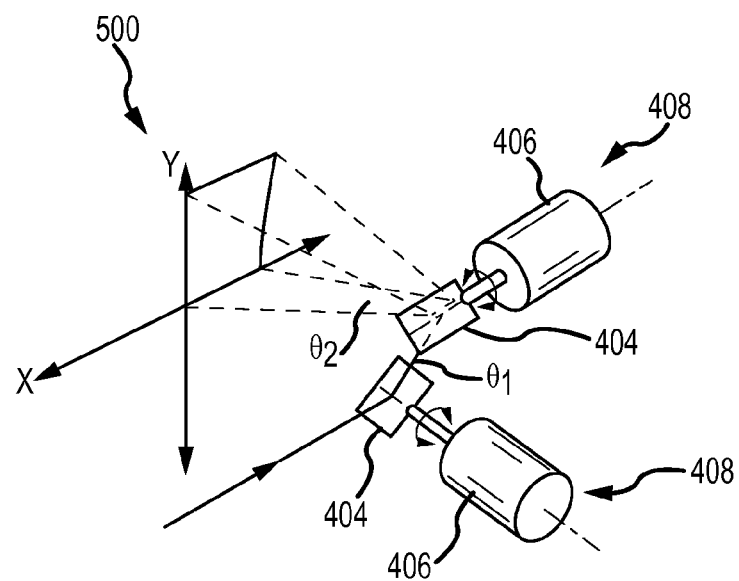
FIG. 5 is a scanning optical system according to an embodiment of the invention.

FIG. 5 is a scanning optical system 500 according to another embodiment of the invention. The scanning optical system 500 may include two reflection units 408 each of which may include at least one mirror 404 configured according to any of the mirror embodiments disclosed herein. By adjusting the mirrors 404, the scanning optical system 500 may scan areas in a plane defined by x-axis and y-axis as shown. For example, light from a light source (e.g., a laser or other electromagnetic energy source) may be reflected from one of the mirrors 404 of one of the deflection units 408 at an angle $\theta_1$ and from another one of the mirrors 404 of another one of the deflection units 408 at an angle $\theta_2$. It will be appreciated that the scanning optical system 500 may include three or more mirrors. Also, a camera system may also include such mirrors.

IV. High-Pressure/High-Temperature Sintering Process

Figure 6:
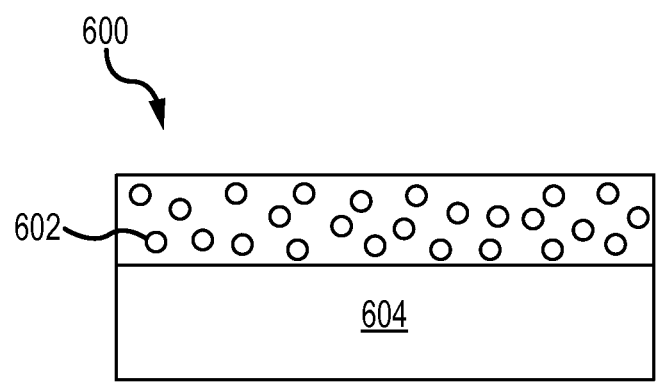
FIG. 6 is a cross-sectional view of an assembly including diamond particles and a cemented carbide substrate to be sintered according to an embodiment of the invention.

FIG. 6 is a cross-sectional view of an assembly 600 including un-sintered diamond particles 602 for HPHT sintering in accordance with embodiments of the invention. The assembly 600 may include a cemented carbide substrate 604 and a layer of diamond particles 602. The cemented carbide substrate 604 may provide the catalyst for catalyzing bonding of the diamond particles during the HPHT sintering process to form a larger, coherent sintered PCD body. The cemented carbide substrate 604 may be removed, for example, through grinding after the HPHT sintering process.

The diamond particles may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm).

In various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes), without limitation. In various embodiments, the plurality of diamond particles may be relatively large having an average particle size of about 40 µm to about 150 µm, such as 50 µm to about 120 µm, 70 µm to about 100 µm, or 40 µm to about 80 µm.

The metal-solvent catalyst from the carbide substrate 504 may be liquefied during the HPHT process and infiltrate into space between the diamond particles. The infiltrated metal-solvent catalyst functions as a catalyst that catalyzes formation of directly bonded diamond grains from the diamond particles to form the sintered PCD body, such as shown in FIGS. 1-3. However, in other embodiments, the metal-solvent catalyst may be provided from a thin metal-solvent catalyst disk placed adjacent to the diamond particles or may be in particulate form that are mixed with the diamond particles.

The assembly 600 may be placed in a pressure transmitting medium, such as a refractory metal can embedded in pyrophyllite or other pressure transmitting medium. The pressure transmitting medium, including the assembly 500 enclosed therein, may be subjected to an HPHT process using an ultra-high pressure press to create temperature and pressure conditions at which diamond may be stable. The temperature of the HPHT process may be at least about 1000° C. (e.g., about 1200° C. to about 1600° C.) and the pressure of the HPHT process may be at least 4.0 GPa (e.g., about 5.0 GPa to about 12 GPa or about 7.5 GPa to about 11 GPa) for a time sufficient to sinter the diamond particles to form a PCD body, such as shown in FIGS. 1-3. For example, the pressure of the HPHT process may be about 7 GPa to about 10 GPa and the temperature of the HPHT process may be about 1150° C. to about 1550° C. (e.g., about 1200° C. to about 1400° C.). The foregoing pressure values employed in the HPHT process refer to the pressure in the pressure transmitting medium that transfers the pressure from the ultra-high pressure press to the assembly 600. Further details about HPHT processing techniques that may be used to practice the embodiments disclosed herein are disclosed in U.S. Pat. No. 7,866,418, which is incorporated herein, in its entirety, by reference.

V. Planarization and Polishing

Once the sintered PCD body is fabricated, the sintered PCD body may be subjected to a planarization process, such as lapping, to planarize at least one surface of the sintered PCD body. In some embodiments, the sintered PCD body may be polished to be a mirror without adding any reflective coating. For example, one or more surfaces of the sintered PCD body may be polished using chemical-mechanical polishing, mechanical polishing, lapping, electropolishing, or combinations thereof to form a reflective surface to exhibit any of the surface roughness values disclosed herein.

VI. Deposition Process

In some embodiments, a reflective coating may be added to the sintered PCD body. For example, a reflective coating, such as a beryllium (Be) coating, an aluminum (Al) coating, a silver (Ag) coating, a gold (Au) coating, a rhodium (Rh), a copper (Cu) coating, a nickel (Ni) coating, a platinum (Pt) coating, alloys of the foregoing metals, and the like, may be deposited over the sintered PCD body by CVD or PVD. The reflective coating may be deposited on the sintered PCD body with or without leaching the sintered PCD body as disclosed below. For example, a reflective material may be deposited/placed into or onto the unoccupied pores of a leached region of a sintered PCD body or any other surface of the PCD body via a liquid infiltration process (e.g., HPHT or hot-isostatic pressing infiltration of the reflective material), CVD, or PVD, or by any other suitable process, without limitation.

VII. Leaching Process

For example, the sintered PCD body may be leached in a suitable acid or by another suitable method to form the leached region 206 (FIG. 2), while the un-leached region of the sintered PCD body 102 is represented as the region 208 in FIG. 2. For example, the acid may be aqua regia, nitric acid, hydrofluoric acid, or combinations thereof The leaching may be performed in a suitable acid or by a suitable other method so that the leached region 206 may be substantially free of the metal-solvent catalyst used in the formation of the sintered PCD body 102.

VIII. Brazing Process

In other embodiments, a reflective coating/layer may be bonded or attached to the sintered PCD body by brazing diffusion bonding, by an adhesive, ultrasonic welding, combinations of the foregoing, or by any other process, without limitation. For example, a reflective coating disk, such as a Be disk, an Al disk, an Ag, an Au disk, disks made from alloys of the foregoing metals, and the like may be brazed to the sintered PCD body by using a braze alloy, such as any of the braze alloys disclosed herein. The braze alloy may have a lower melting temperature than the reflective coating disk and any of the components of the sintered PCD body to which it is bonded such that the braze alloy at least partially melts to bond the reflective coating disk to the sintered PCD body. The reflective coating disk may be further polished after brazing to the sintered PCD body to form a highly reflective surface for reflecting a laser beam.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

The invention claimed is:

1. A mirror for a deflection unit in a scanning system, the mirror comprising:
   a sintered polycrystalline diamond body configured to be operably coupled to a motor, the sintered polycrystalline diamond body including a plurality of randomly oriented diamond grains defining a plurality of interstitial regions, at least a portion of the interstitial regions including a material disposed interstitially therein; and
   a reflective surface formed at least partially from the sintered polycrystalline diamond body or provided thereon, the reflective surface exhibiting a surface roughness of less than about 50 nm Rrms.

2. The mirror of claim 1, further comprising a reflective coating disposed over the sintered polycrystalline diamond body, the reflective coating including the reflective surface.

3. The mirror of claim 2 wherein the reflective coating includes at least one material selected from a group consisting of Be, Al, Ag, Au, Cu, Ni, Pt, Rh, zinc sulfide, titanium dioxide, magnesium fluoride, and silicon dioxide.

4. The mirror of claim 2, further comprising a braze alloy layer or a carbide layer disposed between the sintered polycrystalline diamond body and the reflective coating.

5. The mirror of claim 4 wherein the braze alloy has a lower melting temperature than the reflective coating.

6. The mirror of claim 1 wherein the sintered polycrystalline diamond body includes a first region and a second region, the first region being at least partially free of the material and the second region including the material.

7. The mirror of claim 6 wherein the first region includes an infiltrant therein, the infiltrant includes at least one material selected from a group consisting of Be, Al, Ag, Au, Cu, Ni, Pt, and Rh.

8. The mirror of claim 1, further comprising a cemented carbide substrate bonded to the sintered polycrystalline diamond body.

9. The mirror of claim 1 wherein the surface roughness is about 1 nm Rrms to about 30 nm Rrms.

10. A scanning system, comprising:
an electromagnetic energy source configured to output electromagnetic energy; and
a deflection unit including:
a mirror positioned to receive the electromagnetic energy, wherein the mirror is configured according to the mirror of claim 1; and
a motor operably coupled to the mirror and configured to rotate the mirror to selectively deflect the electromagnetic energy.

11. The scanning system of claim 10 wherein the motor includes a Galvo motor, a magnetic actuator, shape memory alloy actuator, or piezoelectric actuator.

12. The scanning system of claim 10 wherein the electromagnetic energy source includes a laser and the electromagnetic energy includes a laser beam.

13. A method of fabricating a mirror for a deflection unit in a scanning system, comprising:
sintering a plurality of diamond particles in the presence of a metal-solvent material at a pressure of at least 4.0 GPa and a temperature of at least 1000° C. to form a sintered polycrystalline diamond body; and
forming a reflective surface having a surface roughness of less than about 50 nm Rrms, wherein forming a reflective surface includes at least one of:
polishing at least one surface of the sintered polycrystalline diamond body;
depositing a reflective material on and/or in the sintered polycrystalline diamond body and polishing the reflective material; or
bonding a reflective coating to the sintered polycrystalline diamond body and polishing the reflective material.

14. The method of claim 13, further comprising chemically leaching the sintered polycrystalline diamond body to at least partially remove the metal-solvent material prior to depositing the reflective material or bonding the reflective coating thereon.

15. The method of claim 13 wherein bonding a reflective coating to the sintered polycrystalline diamond body includes brazing the reflective coating to the sintered polycrystalline diamond body or bonding the reflective coating to a carbide layer that is bonded to the sintered polycrystalline diamond body.

* * * * *